J. V. HOQUE.
AUTOMOBILE SIGNAL.
APPLICATION FILED MAY 31, 1917.
1,273,611.
Patented July 23, 1918.
FIG. 1.
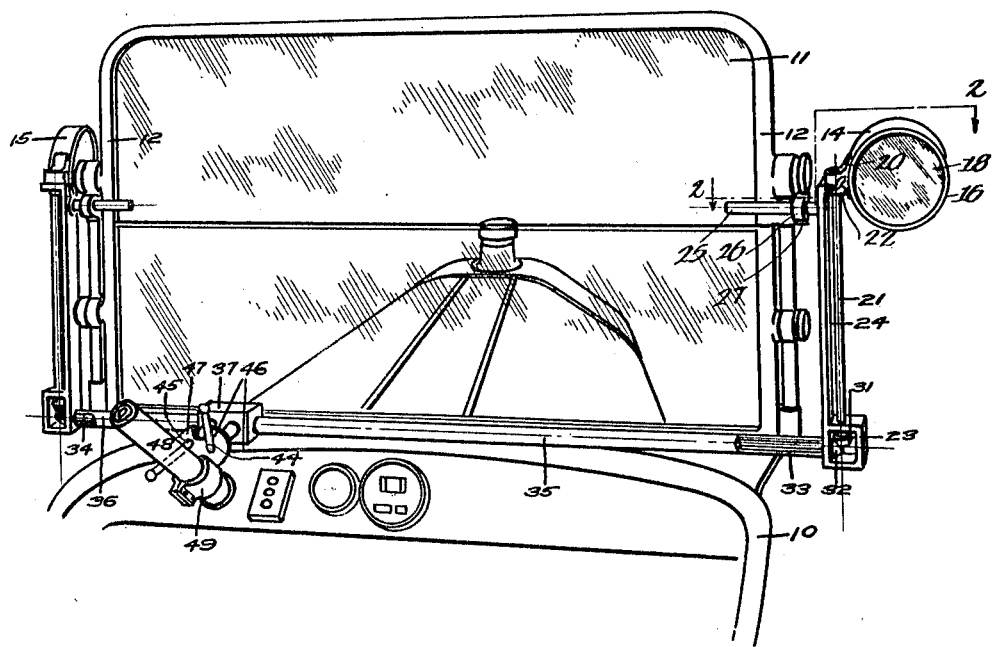
FIG. 2.   FIG. 3.
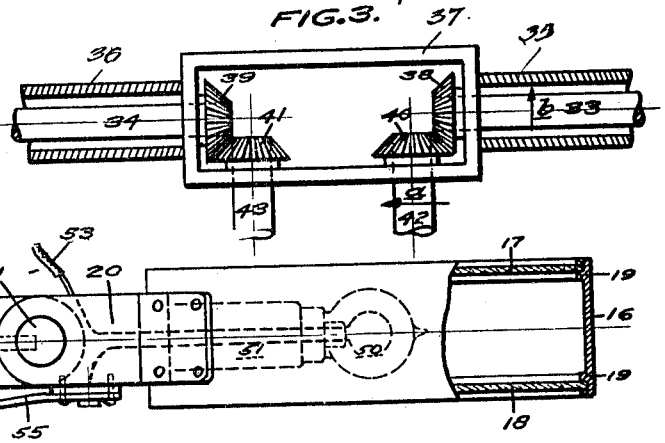
FIG. 4.
INVENTOR
JAMES V. HOQUE

UNITED STATES PATENT OFFICE.

JAMES V. HOQUE, OF LONG BEACH, CALIFORNIA.

AUTOMOBILE-SIGNAL.

1,273,611.  Specification of Letters Patent.  Patented July 23, 1918.

Application filed May 31, 1917. Serial No. 172,088.

*To all whom it may concern:*

Be it known that I, JAMES V. HOQUE, a citizen of the United States, residing at Long Beach, in the county of Los Angeles and State of California, have invented new and useful Improvements in Automobile-Signals, of which the following is a specification.

My object is to make a direction indicator for automobiles which will be effective at night as well as in the day time, and my invention consists in the novel features herein shown, described and claimed.

Figure 1 is a view in perspective illustrating the wind-shield of an automobile as seen looking toward the hood, and particularly discloses the mounting of the direction indicator and the manner in which it operates.

Fig. 2 is an enlarged horizontal section on the line 2—2 of Fig. 1 illustrating one of the indicating semaphores and its mounting upon the wind-shield.

Fig. 3 is a view in plan illustrating the gear box as seen in section and particularly disclosing the correlation of the gears and shafts inclosed therein.

Fig. 4 is a fragmentary perspective showing the relation between the gear box and the steering post of an automobile.

Referring more particularly to the drawings, 10 indicates the body of an automobile upon which is mounted a wind-shield 11 inclosed within a frame 12. This frame is preferably tubular, as shown in Fig. 2 of the drawings, and provides a support for indicating semaphores 14 and 15. These semaphores are formed with a cylindrical outer casing 16, the ends of which are closed by means of glass plates 17 and 18. These plates are suitably held in position against flanges 19 formed around the inner circumference of the case. The semaphores thus constructed are provided with brackets 20 which permit them to be maintained with their glass sides vertical and to swing horizontally upon a semaphore shaft 21 which extends downwardly through a fitting 22 and is again rotatably secured within a housing 23 forming a part of the fitting. The two ends of this fitting being connected by a vertical arm 24. The fittings are formed with horizontally extending shanks 25 which are slidably and horizontally secured within hubs 26. These hubs form a part of mounting brackets 27 and are adapted to conform to the surface of the wind-shield uprights 12 where they are securely held by arcuate clamping plates 28. These plates are fastened to the brackets by cap screws 29 which permit them to be held in a rigid, though detachable manner. The shanks 25 are adjustably held within the hubs 26 by set screws 30, which will operate in a manner that will be readily understood.

The semaphore shafts 21 are fixed to the semaphores at their upper ends and are also provided with bevel gears 31 which are fastened at their lower ends within the housings 23. These gears are in mesh with complementary bevel gears 32 secured at the outer ends of actuating shafts 33 and 34. The actuating shafts are in horizontal and longitudinal alinement and are confined within tubular casings 35 and 36. These casings terminate within a gear box 37. The gear box is rectangular and is secured upon the dashboard of the vehicle. Inclosed within this box are gears 38 and 39 secured to the ends of shafts 33 and 34, respectively, and gears 40 and 41 in mesh with the gears 38 and 39 and adapted to be rotated by lever shafts 42 and 43. These shafts extend from the gear box and are fitted with levers 44 and 45 adapted to move over the faces of quadrants 46 and 47. The quadrants are serrated along their marginal edges to hold the levers in any desired position and are furthermore detachably secured upon the steering column 48 of the vehicle by means of clamping members 49.

The semaphores are provided with incandescent lamps 50 which are mounted within sockets 51. These sockets are adapted to be electrically connected with conductors 52 and 53. The conductor 53 being fastened to terminal 54 of a switch, the blade 55 of which engages it when the semaphore is swung out to the position shown in Fig. 2.

In operation, both of the semaphores 14 and 15 are positioned to extend longitudinally of the car, as particularly indicated by the disposition of the semaphore 15 in Fig. 1. When the driver intends to turn the vehicle to the right, the lever 44 is swung upwardly, as indicated in Fig. 1, and this will rotate the shaft 42 in the direction of the arrow —*a*—. The gear 40 at the end of the shaft 42 will cause rotation of the shaft 33 in the direction of the arrow —*b*—.

Gears 31 and 32 will then be caused to rotate in a manner to swing the semaphore 14 outwardly at right-angles to the side of the car. The glass sides 17 and 18 of this semaphore are colored red and in the daytime may be easily seen. At night the conductors 52 and 53 are connected with a suitable source of electric power and when the semaphore assumes the signaling position here shown, the blade 55 will make contact with the terminal 54 and complete an electric circuit to the incandescent light 50, thus illuminating the semaphore while in its signaling position. When the lever 44 is swung downwardly this circuit will be broken and the semaphore will be caused to assume its original longitudinally alined position along the side of the car.

It will thus be seen that the device here disclosed is composed of strong, easily manipulated parts which are concealed in workman-like manner, and which may be readily operated to indicate the direction, as described.

I claim:

In an automobile signal, a gear box, tubular casings extending from the ends of the gear box, shafts in the tubular casings, bevel gears upon the inner ends of the shafts in the gear box, lever shafts extending horizontally through one side of the gear box, bevel gears upon the ends of the lever shafts in mesh with the first bevel gears, quadrants through which the outer ends of the lever shafts extend, a clamp secured to the quadrants and adapted to engage the lower end of a steering post, and levers connected to the lever shafts in operative position relative to the quadrants; the levers being at the lower end of the steering post.

In testimony whereof I have signed my name to this specification.

JAMES V. HOQUE.

Copies of this patent may be obtained for five cents each, by addressing the "Commissioner of Patents, Washington, D. C."